United States Patent
Atzmon et al.

(10) Patent No.: US 9,529,745 B2
(45) Date of Patent: Dec. 27, 2016

(54) SYSTEM ON CHIP AND METHOD OF OPERATING A SYSTEM ON CHIP

(71) Applicants: Nir Atzmon, Netanya (IL); Ron-Michael Bar, Ramat Hasharon (IL); Eran Glickman, Rishon Le Zion (IL); Benny Michalovich, Austin, TX (US)

(72) Inventors: Nir Atzmon, Netanya (IL); Ron-Michael Bar, Ramat Hasharon (IL); Eran Glickman, Rishon Le Zion (IL); Benny Michalovich, Austin, TX (US)

(73) Assignee: NXP USA, INC., Austin, TX (US)

( * ) Notice: Subject to any disclaimer, the term of this patent is extended or adjusted under 35 U.S.C. 154(b) by 348 days.

(21) Appl. No.: 14/190,374

(22) Filed: Feb. 26, 2014

(65) Prior Publication Data

US 2015/0242343 A1     Aug. 27, 2015

(51) Int. Cl.
 *G06F 13/16* (2006.01)
 *G06F 13/38* (2006.01)
 *G06F 13/32* (2006.01)

(52) U.S. Cl.
 CPC ........... *G06F 13/1673* (2013.01); *G06F 13/32* (2013.01)

(58) Field of Classification Search
 None
 See application file for complete search history.

(56) References Cited

U.S. PATENT DOCUMENTS

| 7,552,306 B2 | 6/2009 | Madhavarao et al. |
| 2007/0174513 A1* | 7/2007 | Wrigley ................. G06F 5/065 710/52 |
| 2011/0153856 A1* | 6/2011 | Piepenbrink ........ H04L 47/2416 709/231 |
| 2013/0055004 A1* | 2/2013 | Koniaris ................... G06F 1/10 713/501 |

FOREIGN PATENT DOCUMENTS

EP       2 219 114 A1     1/2011

* cited by examiner

*Primary Examiner* — Scott Sun

(57) ABSTRACT

A system on chip, SoC, comprising two or more data sources, a memory unit, a memory control unit, and a processing unit. Each of the data sources is capable of providing a data stream. The memory control unit is arranged to maintain, for each of the data streams, a buffer in the memory unit and to route the respective data stream to the processing unit via the respective buffer. Each of the buffers has buffer characteristics which are variable and which comprise at least the amount of free memory of the respective buffer. The memory control unit is arranged to allocate and de-allocate memory regions to and from each of the buffers in dependence of the buffer characteristics of the respective buffer, thereby allowing for re-allocation of memory of the memory unit among the buffers.

A method of operating a system on chip is also described.

15 Claims, 7 Drawing Sheets

SYSTEM ON CHIP AND METHOD OF OPERATING A SYSTEM ON CHIP

FIELD OF THE INVENTION

This invention relates to a system on chip and to a method of operating a system on chip.

BACKGROUND OF THE INVENTION

A system on chip is a data processing device located on a single semi-conductor chip and capable of executing instructions stored in a memory unit on the chip. The instructions may be soft coded or hard coded. A system on chip may comprise multiple interconnected functional units, for example, one or more processor cores, one or more memory units, or input/output units for enabling the system on chip (SoC) to interact with its environment, e.g., via one or more antennas or via wired connections.

A SoC may comprise a buffer, e.g., a First-In-First-Out (FIFO) buffer or, e.g., a stack buffer, connected between a data source and a processing unit. The buffer may absorb an incoming flux of data, i.e. a data stream, while the processing unit is occupied. In many applications, a data source may send out a continuous stream of data which has to be received while the processing unit services the data source only when it is available, then emptying the data that has accumulated in the buffer.

A data source may be any hardware or software component that is capable of providing, e.g., generating or forwarding, a data stream. A processing unit may be any hardware or software component for processing the received data. For example, the data source may be an Ethernet port on the SoC. The processing unit may for example be a hardware accelerator arranged to carry out various processing actions on incoming packets from the data source. A buffer may for example be a FIFO buffer, a data stack, or any other memory structure capable of maintaining a write pointer for indicating a next available address for writing and a read pointer for indicating a next address to read from.

Such buffers may for example be implemented as on-chip static-random-access-memory (SRAM) units. The size of a buffer may be chosen so as to be able to absorb enough data while the processing unit is busy with previously received data. This may notably be a factor of a peak data bandwidth, which may be significantly higher than an average data bandwidth. The present invention, as described further below, is motivated by the insight that providing a buffer with a fixed capacity separately for each of multiple data streams may result in a memory array that may often be largely empty. This may be undesirable as on-chip memories can be an expensive resource, increasing die size and power consumption.

FIG. 1 schematically shows an example of a system on chip 10 in which a data source 12 sends a stream of data to a receiver 14. The receiver 14 transfers the data to a buffer 18 to be read by a processing unit 20. The buffer 18 may be located in a memory unit 16. The memory unit 16 may for example be an SRAM unit. The memory unit 16 may comprise a set of memory regions. Each memory region may comprise, for example, one or more registers. The memory regions may have the same capacity, e.g., a certain number of kilobytes, or they may have different capacities. In a variant of the shown example, there are multiple data sources similar to the shown data source 12 and each of these data sources 12 has a corresponding static buffer, similar to the shown buffer 18, assigned or connected to it.

An application, e.g., a process executed by the processing unit 20, may employ a virtualization mechanism to share a single physical resource among two or more virtual machines, effectively creating several, i.e. two or more, virtual channels on a single physical channel. In a common situation, these virtual machines may be unaware of each other and each may operate independently of the other virtual machines while a hypervisor unit or a super user unit arbitrates between the virtual machines. In such a situation, since each virtual machine "assumes" that it can use the full bandwidth of the physical channel, it may require a buffer having a size adapted to the full bandwidth of the physical channel, for each virtual machine. The total size of the set of buffers provided for the virtual machines is then proportional to the number of virtual machines.

FIG. 2 schematically shows another example of a SoC 10. In this example the SoC 10 comprises four data sources 12a to 12d sharing a single physical line for feeding their data to a processing unit 20. In the example, the processing unit 20 comprises processor cores 20a to 20d. The data sources 12a to 12d may provide data streams simultaneously. An arbitrator unit 22 of the SoC 10 may select one of the data streams and route it to the receiver 14. The receiver 14 may further provide it to the memory unit 16.

The memory unit 16 may comprise, for each of the data sources 12a to 12d, a separate buffer having a fixed capacity. The data sources 12a to 12d may thus be assigned buffers 18a, 18b, 18c, and 18d, respectively. Accordingly, when the arbitrator unit 22 has selected, for example, data source 12c as the active data source among the data sources 12a to 12d, the data stream from the selected data source, e.g., from data source 12c, may be routed to the processing unit 20 through the buffer, e g., buffer 18c, that belongs to the selected data source.

Comparing FIG. 2 to FIG. 1, it is noted that the data rate of the data received by the receiver 14 may be the same in both Figures. In spite of this, the total buffer capacity is four times as large in FIG. 2 as in FIG. 1, assuming that each of the buffers 18a to 18d has the same capacity as the buffer 18 in FIG. 1. However, considering that in both the example of FIG. 1 and the example of FIG. 2 the memory unit 16 receives the same amount of data per time from the receiver 14 it may be expected that the buffers 18a to 18d in FIG. 2 may on average be largely empty.

For example, a device with an Ethernet port, e.g., a one-GB-per-second-Ethernet port, supporting eight virtual channels and a priority-based flow control in accordance with the prior art may require providing a static buffer to each virtual channel wherein the buffer must be large enough to absorb the incoming data while the processor is busy with previously received data. In addition, an emergency buffer may be required to absorb the incoming data from the moment the processor has issued a pause frame to a transmitter on the other side until the flow of data stops. Assuming that the required buffer size to absorb the incoming data at the steady state is 256 KB, the buffer required to absorb peak traffic may be two to four times larger than that, i.e., at least 512 KB. Also assuming that the emergency buffer is 20 KB, the total buffer size required for each virtual channel may be 532 KB. Each of the virtual channels may require a dedicated buffer because it is not known beforehand how the data is distributed among the different virtual channels. Therefore a system designer must assume that at any given point in time any one of the virtual channels may have the full one GB per second bandwidth and therefore a memory array of eight times 532 KB, i.e., approximately 4 MB, must be provided.

Such a static allocation does not exploit the fact that the aggregated traffic on all 8 channels does not exceed the physical limit of one GB per second.

SUMMARY OF THE INVENTION

The present invention provides a system on chip and method as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 3:
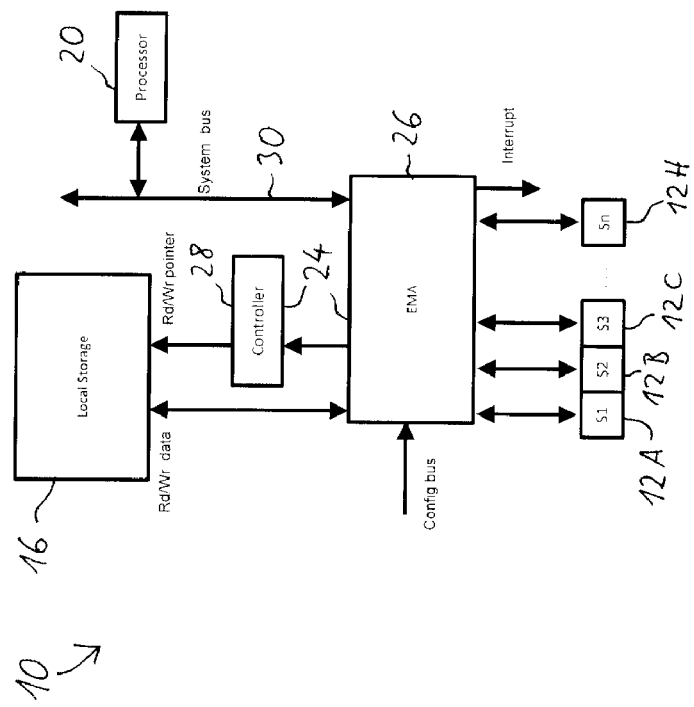
FIG. 3 schematically shows an example of an embodiment of a system on chip.

FIG. 3 schematically shows an example of an embodiment of a system on chip 10 which comprises two or more data sources 12A to 12H, a memory unit 16, a memory control unit 24, and a processing unit 20. In the example, there are six data sources 12A to 12H. In other examples, there may fewer or more data sources (not shown). Each of the data sources 12A to 12H may be capable of providing a respective data stream. The data sources 12A to 12H may be capable of providing their data streams concurrently. The memory control unit 24 is arranged to maintain, for each of the data streams, a respective buffer inside the memory unit 16 and to route the respective data stream to the processing unit 20 via the respective buffer. Each of the thus maintained buffers has buffer characteristics which are variable and which comprise at least the amount of free memory of the respective buffer.

The memory control unit 24 may be arranged to allocate and de-allocate memory to and from each of these buffers in dependence of the buffer characteristics of the respective buffer, thereby allowing memory of the memory unit 16 to be reallocated among the buffers. The size, i.e. the capacity, of each buffer is thus flexible and can be adapted as needed. For example, the buffer characteristics of each buffer may comprise, in addition to the amount of free memory of the buffer, a data accumulation rate of the respective buffer. The data accumulation rate may be defined as the amount of data accumulating in the respective buffer per time, i.e. the rate at which data in the buffer is accumulating. The time interval with respect to which the accumulated data is measured may for example be a sliding time window. The sliding time window may for example comprise a fixed number of clock cycles and may advance periodically, e.g., with each new clock cycle. The current sliding time window may overlap a certain number of previous sliding time windows. Use of a sliding time window allows updating the data accumulation rate of each buffer periodically, e.g., with each new clock cycle.

The operation of allocating and de-allocating memory to and from each buffer may be independent of the buffer characteristics of the respective other one or more buffers. Such a scheme may be simpler to implement than, e.g., an alternative scheme in which the allocation and de-allocation of memory to and from a buffer involves taking into account the buffer characteristics of the other buffers.

In the example of FIG. 3, the memory control unit 24 comprises a memory allocation unit 26 and a control unit 28. The memory allocation unit 26 may also be referred to as the Efficient Memory Allocator (EMA). The memory allocation unit 26 may have an interface to the control unit 28 and to a system bus 30, for example. The memory allocation unit 26 may further have an interface for each of the data sources 12A to 12H. In a variant of the example (not shown), the memory allocation unit 26 does not have a dedicated interface per data source but is arranged to receive the data streams from the data sources 12A to 12H via, e.g., the system bus 30. In either case the memory allocation unit 26 may be arranged to identify the particular data source of a received data stream, for example, on the basis of a destination address of the respective data stream or on the basis of a source identification tag included in the data stream.

The memory allocation unit 26 may be arranged to monitor the amount of data written to the memory unit 16 for each of the data sources 12A to 12H, e.g., using a sliding time window, in order to determine an average data rate. Similarly, the memory allocation unit 26 may also be arranged to monitor the amount of data read from each of the buffers assigned to the data sources 12A to 12H in the memory unit 16. When the rate of data accumulation for a certain data source exceeds a threshold, e.g., a user configurable threshold, the memory allocation unit may allocate additional memory to that data source. The data accumulation rate may be defined as the difference between the rate at which data is written to the respective buffer and the rate at which data is read from the respective buffer. A negative data accumulation rate may be referred to as a data depletion rate. Similarly, a negative data depletion rate may be referred to as a data accumulation rate. It is noted that the memory allocation unit does not necessarily determine or evaluate the actual rate of write accesses to the respective buffer but may determine the data accumulation rate on the basis of a hypothetical constant data retrieval rate, that is, by assuming that the processing unit reads data from the memory unit 16 at a fixed rate. The memory allocation unit may be arranged to allocate additional memory to a given buffer in response to detecting that an average rate of write transactions to that buffer is above a certain threshold. This threshold may be user-configurable.

Similarly, when the data accumulation rate of the buffer drops below a certain, e.g., user-configurable, threshold, e.g., zero, or equivalently when the data depletion rate of the buffer exceeds a certain threshold, and if a memory region of that buffer is empty, the memory allocation unit may de-allocate that memory region from the buffer. The de-allocated memory region may thus be reused for another data stream.

In one example, the memory allocation unit 26 is configurable by a user so as to ignore the rate of read accesses and to de-allocate a memory region in response to an average of write accesses dropping below a certain threshold, e.g., a user-configurable threshold, when the memory region is empty. Furthermore, the boundaries of a memory region allocated to a buffer associated with a certain data source may be user-configurable.

Figure 1:
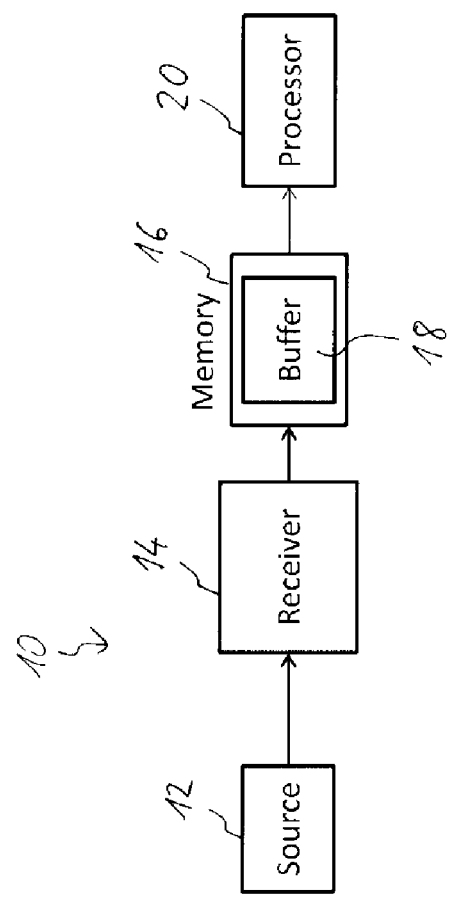
FIG. 1 schematically shows an example of a system on chip.
Figure 2:
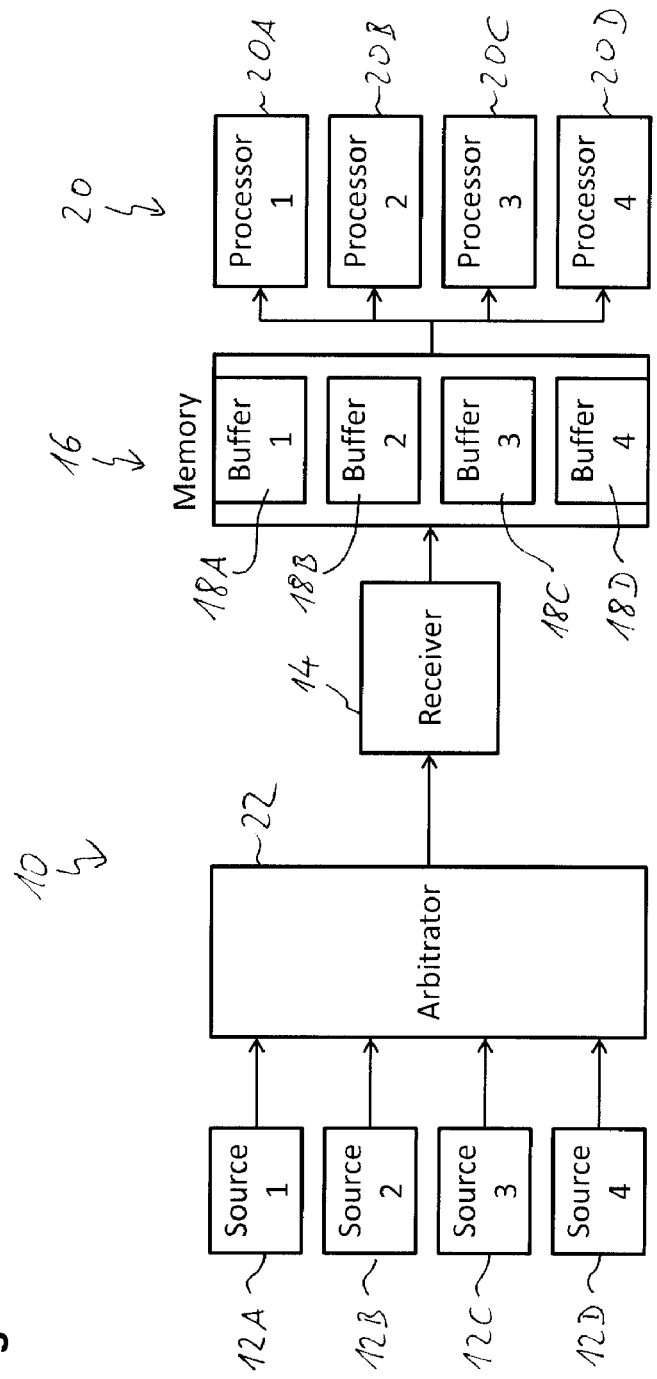
FIG. 2 schematically shows an example of an embodiment of a system on chip.

Thus each of the data sources 12A to 12H may have a dynamic buffer assigned to it. In the example of FIG. 3, there are eight data sources 12A to 12H and accordingly eight buffers located inside the memory unit 16. Each of these buffers may be dynamic in the sense that its size, i.e. its data capacity, may be varied, in dependence of, e.g., a rate at which data is accumulating in the respective buffer. The memory provided by the memory unit 16 may thus be used more efficiently as compared to, for example, the schemes described above in reference to FIGS. 1 and 2 in which each data source, or, equivalently each data stream, has a static buffer assigned to it. In other words, the memory unit 16 may comprise one or more memory regions that may be allocated to different buffers, depending on the data accumulation rates of these buffers. Operation of the data sources may be unaffected by any variations in the buffer size of the respective data source. For instance, each of the data sources 12A to 12H may operate under the assumption that it has a buffer inside the memory unit 16 at a certain constant size. This constant size may for instance be the maximum possible size of the buffer, e.g., the total size of the memory provided by the memory unit 16.

In operation, it may occur that the memory unit 16 runs out of free memory regions so that no more memory can be allocated to the buffers. An alarm mechanism for signaling such an event may be implemented in, e.g., the memory allocation unit 26. For example, the memory allocation unit 26 may be arranged to initiate an interrupt when the memory unit 16 has run out of free memory. The system on chip 10 may be arranged so as to allow such an interrupt to be handled by, e.g., user software in a user defined manner. The interrupt may for example include issuing a signal to one or more of the data sources 12A to 12H to stop sending data.

Figure 4:
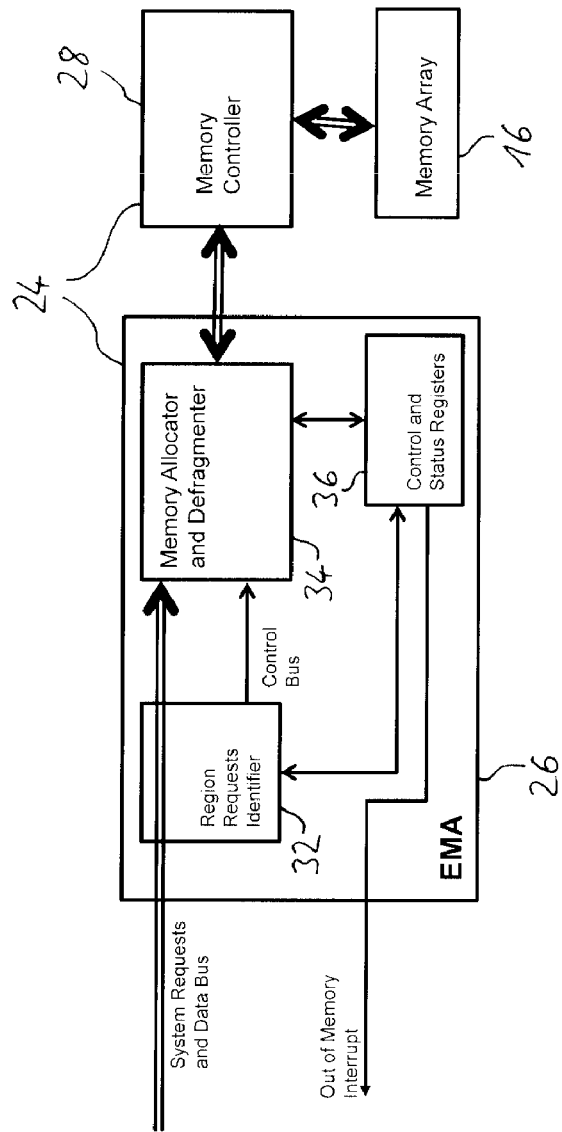
FIG. 4 schematically shows an example of an embodiment of a memory control unit.

An example of an embodiment of the control unit 24 is further described in reference to FIG. 4. The memory allocation unit 26 may for example comprise a Region Request Identification (RRI) unit 32, a memory allocation and de-fragmentation (MAD) unit 34, and a set of control and status registers 36. The RRI unit 32 may be arranged to detect requests for transactions (i.e., transaction requests) on, e.g., the system bus 30. In one example, the SoC 10 may comprise dedicated data source buses and in this case the RRI unit 32 may also monitor these dedicated data source buses. The RRI unit 32 may further be arranged to keep statistical data of read and write accesses to the buffers in the memory unit 16, e.g., as described above. When the RRI unit 32 detects that the data accumulation rate of one of the buffers is above an allocation threshold or below a de-allocation threshold, it may instruct the MAD unit 34 to allocate or to de-allocate a memory region in the memory unit 16 to or from the respective buffer. The MAD unit 34 may be arranged to keep a table or list of the memory regions allocated to each data source and of all free memory regions in the memory unit 16. When the MAD unit 34 is requested by the RRI unit 32 to allocate a memory region to a certain data source, it may respond by allocating one of the free memory regions to the respective data source. Similarly, when the MAD unit 34 is requested by the RRI unit 32 to de-allocate a memory region from a certain buffer, it may remove it from the list of allocated memory regions and add it to the list of free memory regions.

Different algorithms may be used to implement the above-described scheme. For example, the RRI unit 32 may comprise, for each data source, a respective data counter which is incremented in response to data written to the respective buffer and decremented in response to data retrieved from the buffer. The counter may be zeroed at regular time intervals, e.g., at user defined time intervals. At the end of each of these time intervals, the respective counter value may serve as an indication of the data accumulation rate of the respective buffer. The counter value may be compared to an allocation threshold and a de-allocation threshold, and a memory region may be added or removed to the respective buffer unless the data accumulation rate is between the de-allocation threshold and the allocation threshold. The allocation threshold should in this example be higher than the de-allocation threshold.

In another example, the RRI unit 32 comprises a counter for keeping track of an amount of data written during a sliding window. The sliding window may have a user-defined length. When the amount of data written during the sliding window exceeds the allocation threshold, a command for allocating a new memory region to the respective buffer may be issued. Furthermore a mask bit may be asserted to block additional requests for the same data source for a certain period, e.g., a user-defined period. There may be further methods for determining or estimating the data accumulation rate for each buffer.

The MAD unit 34 may further be arranged to translate an address indicated by a transaction request on the system bus or on the optional dedicated data source buses, if present, to a physical address of a memory array which corresponds to the allocated memory regions.

Figure 5:
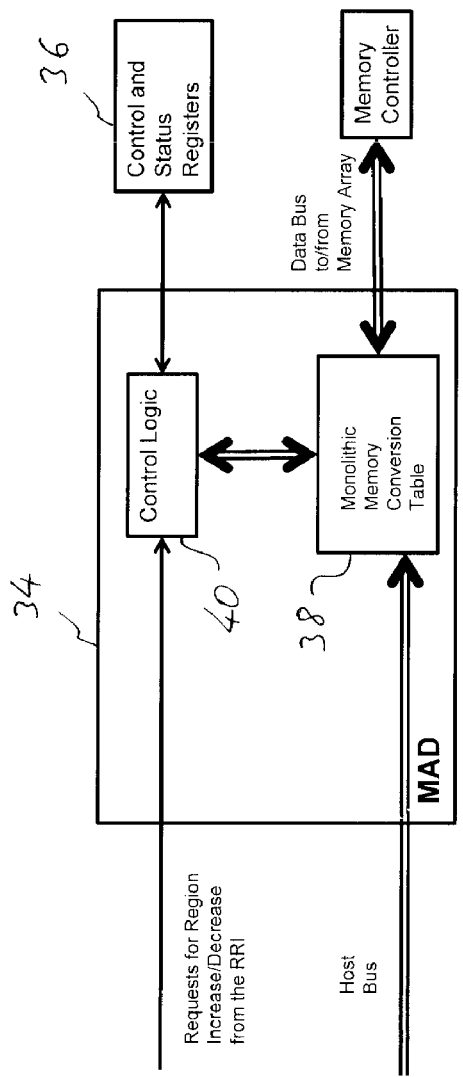
FIG. 5 schematically shows an example of an embodiment of a memory allocation unit.

As schematically shown in FIG. 5, the MAD unit 34 may for example comprise a control logic unit 40 arranged to receive memory allocation and memory de-allocation commands from, e.g., the RRI unit 32 and to program a monolithic memory conversion table 38 with an original address, a physical address, and a size of allocated memory regions. The original address may relate to a monolithic memory region. The physical address may relate to a fragmented memory region. The monolithic conversion table may serve to translate an address from a monolithic address used by a data source and by the processing unit 20 to a physical address of the memory array. The control logic unit 40 may be arranged to keep track of allocated and free memory regions.

The control and status register set 36 (see again FIG. 4) may include registers configurable by a user in order to define the parameters mentioned in this disclosure, for example, status registers for statistical data collection, e.g., referring to a number of memory regions allocated to each data source.

The MAD unit 34 may for example be implemented as a set of registers or, alternatively, as a static random access memory unit. In the latter case, a small prefetch buffer may be required to maintain adequate performance. The memory control unit may be arranged to collect statistical data of incoming traffic and may use it to allocate memory dynamically.

The present teaching may be useful in any application in which a buffer, e.g., a FIFO buffer or a data stack, is connected between a data source and a processor, the data source supporting several virtual channels. For example, it may find application in a device with a network port supporting virtual channels.

Allocating memory dynamically to the multiple buffers associated with the multiple data sources the total buffer required may be 512 KB in this example, for peak aggregated traffic over all channels. If an emergency buffer of, e.g., 20 KB for each virtual channel is included, an additional 8 times 20 KB may be required resulting in a total of 672 KB.

In other words, now referring back to FIG. 3, the memory control unit 24 may be arranged to associate, with each of the buffers, an allocation condition and a de-allocation condition and to monitor whether the respective buffer characteristics satisfy the allocation condition and whether they satisfy the de-allocation condition. The memory control unit 24, in response to detecting that the buffer characteristics of the buffer in question satisfy the allocation condition, may allocate memory of the memory unit 16 to the respective buffer. Similarly, in response to detecting that the respective buffer characteristics satisfy the de-allocation condition, the memory control unit 24 may de-allocate memory of the memory unit 16 from the respective buffer.

The buffer characteristics of a given buffer may include a hypothetical fill time. The fill time of a buffer is the time it takes to fill the buffer starting from a present fill level of the buffer and assuming a certain constant data accumulation rate. The hypothetical fill time may, for example, be determined as the remaining free memory of the buffer divided by the current data accumulation rate of the buffer. The memory control unit 24 may be arranged to set an allocation threshold for each of the buffers. The allocation threshold may be the same for each buffer. Alternatively, the buffers may have individual allocation thresholds associated with them. The allocation condition associated with a given buffer may be satisfied when the hypothetical fill time of the respective buffer is shorter than the respective allocation threshold. Both the data accumulation rate and the free memory of a given buffer may be determined and updated repeatedly. The hypothetical fill time being shorter than the allocation threshold may be an indication that the buffer may soon be full unless additional memory is allocated to the buffer. Therefore, allocating a memory region to the buffer when the hypothetical fill time is shorter than the allocation threshold may remove this risk.

Figure 6:
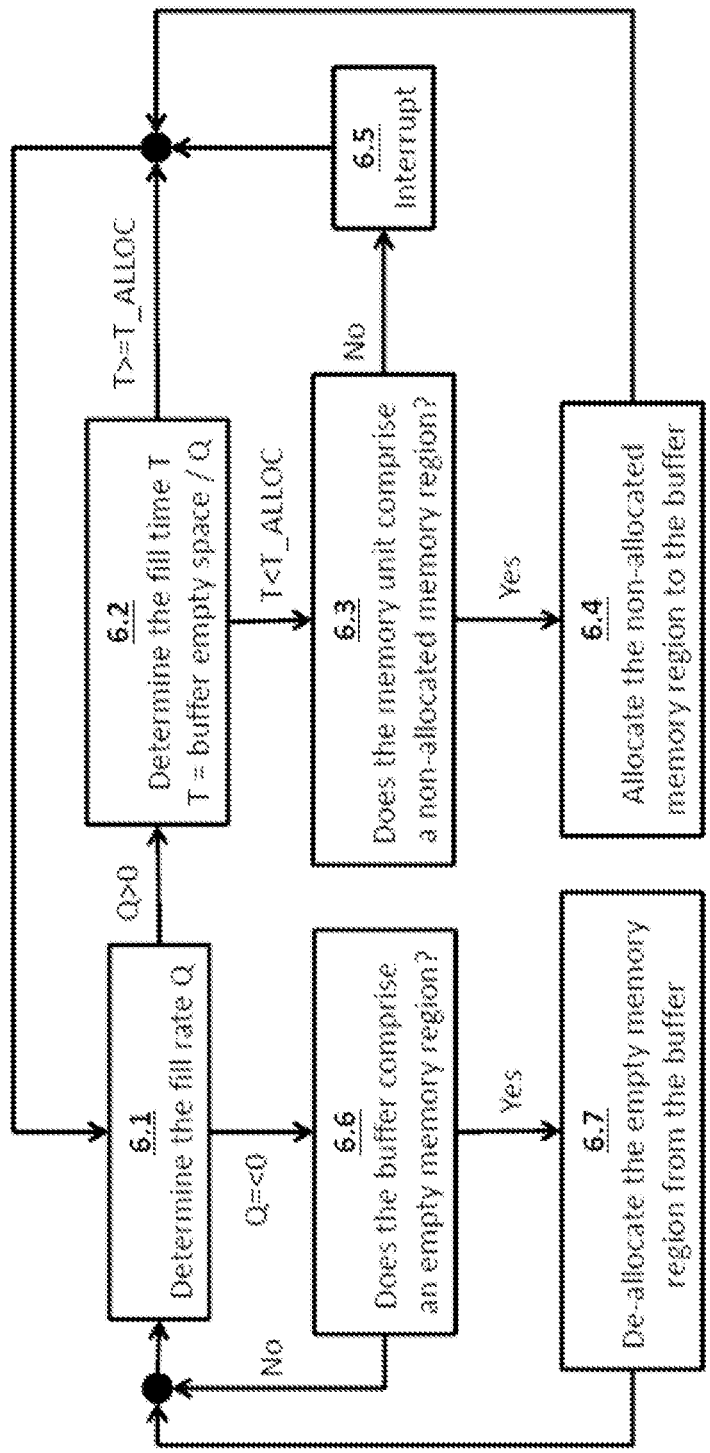
FIG. 6 shows a flow chart of an example of an embodiment of a method of operating a system on chip.

Referring now to FIG. 6, an example of a method of operating a system on chip is described. The system on chip may comprise two or more data sources, a memory unit, a memory control unit, and a processing unit. The system on chip may for example be the SoC 10 described above. The method may comprise, for each of the data sources, providing a data stream. The method may comprise, for each of the data streams: maintaining a buffer within the memory unit and routing the respective data stream to the processing unit via the respective buffer. Each of these buffers may have buffer characteristics which are variable and which include at least the amount of free memory of the respective buffer. The method may further include allocating and de-allocating memory of the memory unit to and from each buffer in dependence of the buffer characteristics of the respective buffer, thereby reallocating memory among the buffers. The data streams may for example be Ethernet data streams.

The flow chart in FIG. 6 refers to one buffer among the two or more buffers in the memory unit. In order to determine whether memory should be allocated or de-allocated to or from the buffer, it may be determined whether the current data accumulation rate Q of the buffer is positive or negative, i.e., whether the buffer is filling or emptying (Box 6.1).

If the data accumulation rate Q is positive (Q>0), a fill time of the buffer may be estimated (Box 6.2). A hypothetical fill time T of the buffer may thus be determined. The hypothetical fill time T may, for example, be determined as the amount of free memory of the buffer divided by the current data accumulation rate Q of the buffer. If the hypothetical fill time T is greater than an allocation threshold T_ALLOC, i.e., if T>T_ALLOC, no memory is allocated to or de-allocated from the buffer, i.e., the buffer size may remain unchanged, and the fill time T may be re-estimated at a later time. The process of flow may thus return to Box 6.1.

If, however, the hypothetical fill time T (determined in Box 6.2) is less than or equal to the allocation threshold T_ALLOC, it may be determined whether the memory unit comprises a free memory region (6.3), i.e., a non-allocated memory region. If it contains a free memory region, that memory region may be allocated to the buffer (6.4). Otherwise, i.e., if the memory unit does not contain any free memory region that could be allocated to the buffer, an interrupt may be triggered (6.5) and the process flow may return to Box 6.1. The interrupt may involve an error handling action. The error handling action may be user-configurable. From Box 6.5, the process flow may return to Box 6.1.

If, however, now referring again to Box 6.1, the data accumulation rate Q is zero or negative (Q=0 or Q<0), i.e., if the buffer is being depleted, it may be determined whether the buffer comprises an empty memory region (Box 6.6). If the buffer comprises an empty memory region, the empty region may be de-allocated from the buffer (Box 6.7). The de-allocated memory region may thus become available for being allocated to other buffers. The process flow may then return to Box 6.1.

In a variant (not shown) of this example, a memory region may be de-allocated from a given buffer even when the data accumulation rate Q of the buffer is positive, provided that the hypothetical fill time is sufficiently large. For example, each buffer may have a de-allocation threshold T_DEALLOC associated with it. The de-allocation threshold may be larger than the allocation threshold, and an empty memory region may be de-allocated from the buffer in response to detecting that the hypothetical fill time is larger than the de-allocation threshold.

Figure 9:
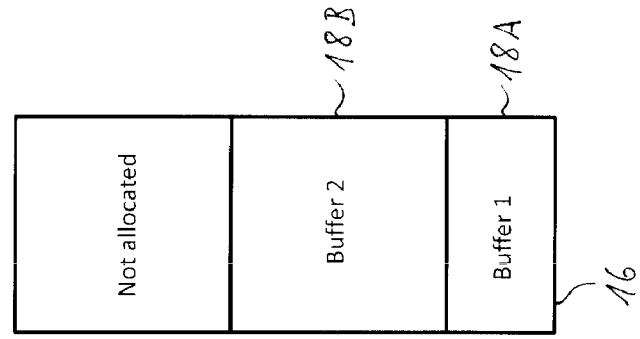
FIGS. 7, 8, and 9 schematically illustrate an example of allocation and re-allocation of memory to multiple buffers for buffering multiple data streams.
Figure 8:
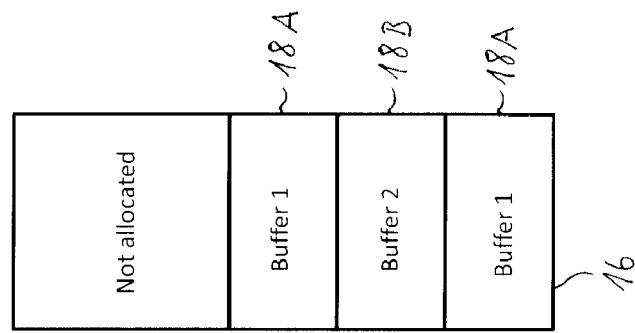
Figure 7:
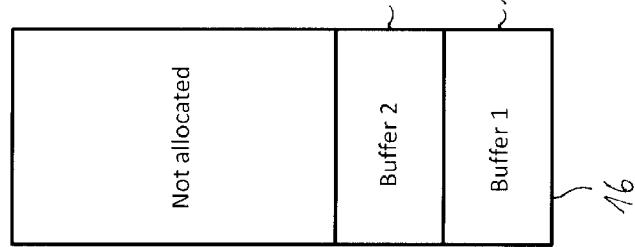

FIGS. 7, 8, and 9 schematically illustrate an example of allocating and de-allocating memory of the memory unit 16 to and from a first buffer 18A and a second buffer 18B. FIG. 7 relates to a first point in time at which the buffers 18A and 18B each consist of a respective initial region of the memory unit 16. A remaining large region of the memory unit is not allocated in this example. FIG. 8 relates to a later second point in time in which part of the previously non-allocated region has now been allocated to the buffer 18A. Note that the buffer 18A now comprises two non-contiguous memory regions. FIG. 9 relates to a later third point in time in which part of the memory of the memory unit 16 has been de-allocated from the buffer 18A and allocated to the buffer 18B.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the control unit 28 and the memory allocation unit 26 may be implemented as one module. Also, the processing unit 20 may be connected to the memory allocation unit 26 via a dedicated data line and not via the system bus.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A system on chip, SoC, comprising two or more data sources, a memory unit, a memory control unit, and a processing unit,
   wherein each of the data sources is capable of providing a data stream,
   wherein the memory control unit is arranged to maintain, for each of the data streams, a buffer in the memory unit and to route the respective data stream to the processing unit via the respective buffer,
   wherein each of the thus maintained buffers has buffer characteristics which are variable and which comprise at least the amount of free memory of the respective buffer and a data accumulation rate of the respective buffer,
   wherein the memory control unit is arranged to allocate and de-allocate memory regions to and from each of said buffers in dependence of the data accumulation rate of the respective buffer, thereby allowing for re-allocation of memory of the memory unit among the buffers, and
   wherein the buffer characteristics of each buffer include a hypothetical fill time T and wherein the memory control unit is arranged to associate, with each of the buffers, an allocation threshold T_ALLOC and to allocate a memory region in the memory unit to the respective buffer in response to detecting that the hypothetical fill time T is less than the allocation threshold T_ALLOC.

2. The SoC of claim 1, wherein the data accumulation rate of the respective buffer is an amount of data accumulated in the respective buffer during a data accumulation window which is a sliding time window.

3. The SoC of claim 1, wherein said operation of allocating and de-allocating memory to and from each buffer is independent of the buffer characteristics of the respective other one or more buffers.

4. The SoC of claim 1, wherein the memory control unit is arranged to determine the hypothetical fill time of the respective buffer on the basis of the amount of free memory of the respective buffer and on the basis of the data accumulation rate of the respective buffer.

5. The SoC of claim 1, wherein the memory control unit is arranged to initiate an interrupt when the hypothetical fill time T of any of the buffers is less than the allocation threshold T_ALLOC but the amount of free memory in the memory unit is insufficient for allocating memory to the respective buffer.

6. The SoC of claim 1, wherein the memory control unit is arranged to determine for each of the buffers whether the respective buffer comprises an empty memory region when the data accumulation rate of the respective buffer is negative and in this case to de-allocate the empty memory region from the respective buffer.

7. The SoC of claim 1, wherein the memory unit is a random access memory unit.

8. The SoC of claim 1, wherein the memory control unit is capable of allocating non-contiguous memory regions to any one of said buffers.

9. The SoC of claim 1, wherein one or more of the data sources is an Ethernet port.

10. The SoC of claim 1, arranged to select one of the data sources among the data sources and to route only the data stream from the selected data source to the memory control unit.

11. A method of operating a system on chip, wherein the system on chip comprises two or more data sources, a memory unit, a memory control unit, and a processing unit, and wherein each of the data sources is capable of providing a data stream and the method comprises, for each of the data sources:

maintaining a buffer in the memory unit;

routing the data stream from the respective data source to the processing unit via the buffer;

wherein each of the thus maintained buffers has buffer characteristics which are variable and which include at least the amount of free memory of the respective buffer and a data accumulation rate of the respective buffer, wherein the method includes:

allocating and de-allocating memory regions of the memory unit to and from each buffer in dependence of the data accumulation rate of the respective buffer, thereby re-allocating memory among said buffers, and wherein the buffer characteristics of each buffer include a hypothetical fill time T and wherein the memory control unit is arranged to associate, with each of the buffers, an allocation threshold T_ALLOC and to allocate a memory region in the memory unit to the respective buffer in response to detecting that the hypothetical fill time T is less than the allocation threshold T_ALLOC.

12. The method of claim 11, wherein one or more of the data streams are Ethernet data streams.

13. The SoC of claim 1, wherein said operation of allocating and de-allocating memory to and from each buffer is independent of the buffer characteristics of the respective other one or more buffers.

14. The SoC of claim 2, wherein said operation of allocating and de-allocating memory to and from each buffer is independent of the buffer characteristics of the respective other one or more buffers.

15. The SoC of claim 4, wherein the memory control unit is arranged to initiate an interrupt when the hypothetical fill time T of any of the buffers is less than the allocation threshold T_ALLOC but the amount of free memory in the memory unit is insufficient for allocating memory to the respective buffer.

* * * * *